Patented July 16, 1946

2,404,171

UNITED STATES PATENT OFFICE 2,404,171

MANUFACTURE OF RUBBER IN CELLULAR FORM

George Monty Hamilton, London, England, assignor to Callender's Cable & Construction Company Limited, London, England, a British company No Drawing. Application April 3, 1941, Serial No. 386,657. In Great Britain May 16, 1940

2 Claims. (Cl. 260—724)

This invention relates to an improved method of producing hard rubber, i. e., ebonite in cellular form.

In speaking of cellular form it is intended to refer to the form in which the material contains a number of separate cells. This condition is to be distinguished from the sponge-like condition in which the solid material contains a number of connected cells and passages. In the cellular form the interconnection does not exist.

The process with which the invention deals is of the type in which the cellular form is arrived at by extension of the material by the decomposition within the mass of material of a gas-producing body distributed therein, this decomposition being brought about by the application of heat. It has been found in the past that it is readily practicable to produce sponge-like material by such a proces, but that it is not practicable to produce cellular material by this process unless special precautions are taken, such as the application of high external pressure in the early part of the process, to give the material which surrounds the small bodies of gas support to enable it to maintain unbroken walls against the pressure of the evolving gas.

By the present invention we overcome this condition by using for the purpose of gas evolution a substance which does not decompose rapidly, if at all, at a temperature which is sufficiently high for the rubber to develop its internal strength of cohesion; that is to say, the vulcanisation can proceed to the desired extent before the evolution of gas takes place. After this, by raising the temperature, vigorous decomposition of the gas-producing material can be caused to take place. In this way a controllable process for the production of cellular material is provided. The process accordingly consists of two stages. In the first the material is subjected to heat at a temperature and for a period sufficiently long to produce partial vulcanisation, up to a degree sufficient to give an effective increase in the internal strength of the material. No evolution of gas takes place in this stage. In the second stage the temperature is higher and the gas is evolved and the material allowed to expand and the vulcanisation is completed.

Ferrous oxalate is a decomposable material possessing the properties above referred to. Below 150° C. it decomposes only slowly, if at all, so that the first stage can be carried out below this temperature and the second stage at a higher temperature.

The finely divided decomposing material is mixed with the rubber and the vulcanising and other ingredients and partial vulcanisation is carried out at a temperature below the rapid decomposition point for a time long enough to develop the requisite internal strength; then the temperature is raised above the rapid decomposition point, whereupon the gas is evolved and the material is allowed to expand freely. It is kept at this higher temperature for a sufficient period to complete the vulcanisation. The first stage of the process may be carried out under atmospheric pressure or some higher pressure; the second is carried out without external pressure above atmospheric. Pressure external to the body of rubber takes no direct part in the process but it may be convenient to have superatmospheric pressure in the first stage in order to make use of saturated steam at a temperature above 100° C. as the heating agent. It is unnecessary for cooling to take place between the two stages.

An example of the improved process of producing a cellular body of hard rubber having a density of about 10 lbs. per cubic foot, will now be described.

The mix has the following composition in parts by weight:

| | |
|---|---|
| Smoked sheet | 400 |
| Sulphur | 400 |
| Magnesium oxide | 10 |
| Diphenyl-guanidine | 2 |
| Ferrous oxalate | 75 |
| High melting bitumen | 100 |

This mix is compounded in the usual manner. It can be separated into portions of the right shape and size for the final product, either before the first stage of treatment or between the two stages. The first stage consists of vulcanising for a period of 120 minutes in saturated steam at a gauge pressure of 26 lbs. per square inch, that is at 131° C. When this stage is completed pressure is removed and the temperature is raised to 170° C. and maintained for two hours. This second stage may be carried out by means of an externally heated mould, which is filled by the expanded material in its final form.

A further advantage of the use of the gas-producing material having a high decomposition temperature is that the mix containing such material can be dealt with in accordance with the usual technique of rubber manufacture in mixing, working and extrusion and any other steps, since the use of temperatures employed in this technique will not produce premature evolution of gas.

What I claim as my invention is:

1. A process of producing cellular hard rubber, comprising mixing with a rubber composition ferrous oxalate in finely divided form, heating the mixed composition to a temperature substantially below 150° C., but high enough to vulcanise the rubber partially, for a time sufficient to cause the composition to develop internal strength by vulcanisation, and then heating the composition to a temperature substantially above 150° C., producing by this latter heating first the decomposition of the ferrous oxalate and thereby the expansion of the composition to a cellular form and then the completion of vulcanisation.

2. A process of producing cellular hard rubber, comprising mixing with a rubber composition ferrous oxalate in finely divided form, heating the mixed composition to about 130° C. for a time sufficient to cause the composition to develop internal strength by vulcanisation, and then heating the composition to 170° C., producing by this latter heating first the decomposition of the ferrous oxalate and thereby the expansion of the composition to a cellular form and then the completion of vulcanisation.

GEORGE MONTY HAMILTON.